United States Patent
Ignaczak et al.

(10) Patent No.: US 9,194,523 B2
(45) Date of Patent: Nov. 24, 2015

(54) V-BAND CLAMP WITH V-INSERT SEGMENTS

(75) Inventors: Brian T. Ignaczak, Rochester, MI (US); Alex Y. Chen, Vernon Hills, IL (US); Milan Ljuljdurovic, Maconb, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 114 days.

(21) Appl. No.: 13/541,741

(22) Filed: Jul. 4, 2012

(65) Prior Publication Data
US 2013/0174384 A1 Jul. 11, 2013

Related U.S. Application Data

(60) Provisional application No. 61/504,287, filed on Jul. 4, 2011.

(51) Int. Cl.
| | |
|---|---|
| *F16L 37/20* | (2006.01) |
| *F16B 2/08* | (2006.01) |
| *F16L 23/10* | (2006.01) |
| *F01N 13/18* | (2010.01) |

(52) U.S. Cl.
CPC .............. *F16L 37/20* (2013.01); *F01N 13/1838* (2013.01); *F16B 2/08* (2013.01); *F16L 23/10* (2013.01); *Y10T 24/1424* (2015.01)

(58) Field of Classification Search
USPC ....... 24/279, 280, 281, 282, 284, 286, 20 LS; 285/411, 364, 365, 406
See application file for complete search history.

(56) References Cited

U.S. PATENT DOCUMENTS

| | | | | |
|---|---|---|---|---|
| 2,841,420 | A * | 7/1958 | Woolsey et al. | 285/421 |
| 2,842,385 | A * | 7/1958 | Webster et al. | 285/408 |
| 3,010,172 | A * | 11/1961 | Kaplan | 24/279 |
| 3,019,036 | A * | 1/1962 | Stanger | 285/18 |
| 3,861,723 | A | 1/1975 | Kunz et al. | |
| 5,301,986 | A | 4/1994 | Yehezkeli | |
| 7,320,485 | B2 | 1/2008 | Amendolea et al. | |
| 8,454,056 | B2 * | 6/2013 | Fernandes et al. | 285/81 |
| 8,500,174 | B2 * | 8/2013 | Gibb | 285/367 |
| 2006/0202480 | A1 | 9/2006 | Cassel et al. | |

FOREIGN PATENT DOCUMENTS

EP   1600680   11/2005

OTHER PUBLICATIONS

International Search Report for PCT application No. PCT/US2012/045477, dated Nov. 26, 2012, 3 pages.
Written Opinion for PCT application No. PCT/US2012/045477, dated Nov. 26, 2012, 3 pages.

* cited by examiner

*Primary Examiner* — Robert J Sandy
*Assistant Examiner* — Michael Lee
(74) *Attorney, Agent, or Firm* — Reising Ethington P.C.

(57) ABSTRACT

A v-band clamp having a band extending circumferentially from a first end to a second end, a latch assembly located at the first and second ends of the band, and a plurality of v-insert segments located radially underneath the band when the v-band clamp is tightened on a pair of tubular body end flanges. The latch assembly includes a fastener used to tighten the v-band clamp and the plurality of v-insert segments include a first v-insert segment attached to the band and a second v-insert, wherein, when the v-band clamp is tightened on the pair of end flanges, the band moves circumferentially independently relative to the second v-insert segment.

12 Claims, 6 Drawing Sheets

V-BAND CLAMP WITH V-INSERT SEGMENTS

CROSS-REFERENCE TO RELATED APPLICATION

This application claims the benefit of U.S. Provisional Patent Application No. 61/504,287, filed Jul. 4, 2011, the entire contents of which are hereby incorporated by reference.

TECHNICAL FIELD

This invention relates to v-band clamps for joining tubular bodies, and to v-band clamps having v-insert segments.

BACKGROUND OF THE INVENTION

V-band clamps are typically used to join tubular bodies that have end flanges extending outwardly from the main tubular structures of the tubular bodies. These types of tubular bodies are used in automotive exhaust systems and in other applications. V-band clamps usually include an outer band, a latch assembly to loosen and tighten the v-band clamp, and multiple inner v-insert segments. Each v-insert segment is normally attached to the inner surface of the band and has side walls that normally form the same angle as one another. The side walls form channels that receive the end flanges of the tubular bodies. When the v-band clamps are tightened on the tubular bodies, radial and axial forces are exerted at the end flanges to form a fluid-tight joint between the tubular bodies.

SUMMARY OF THE INVENTION

In accordance with an aspect of the invention, there is provided a v-band clamp that includes a band extending circumferentially from a first end to a second end, a latch assembly located at the first and second ends of the band, and a plurality of v-insert segments located radially underneath the band when the v-band clamp is tightened on a pair of tubular body end flanges. The latch assembly includes a fastener used to tighten the v-band clamp and the plurality of v-insert segments include a first v-insert segment attached to the band and a second v-insert, wherein, when the v-band clamp is tightened on the pair of end flanges, the band moves circumferentially independently relative to the second v-insert segment. Different embodiments of this v-band clamp may include one or more of the following additional features either alone or according to all technically possible combinations:

The first v-insert segment may be attached to the band via at least one spot weld.
  The second v-insert segment may be unattached to the band and remain unattached to the band when the v-band clamp is tightened on the pair of end flanges.
  The first v-insert segment may be located at a circumferential position of the band that is away from the latch assembly, and the second v-insert segment may be located at a circumferential position of the band that is adjacent the latch assembly.
  The first v-insert segment may have a base wall, a first side wall extending from the base wall, and a second side wall extending from the base wall, the first and second side walls making a first angle in cross-sectional profile. The second v-insert segment may have a base wall, a first side wall extending from the base wall of the second v-insert segment, and a second side wall extending from the base wall of the second v-insert segment, with the first and second side walls of the second v-insert segment making a second angle in cross-sectional profile, and with the second angle having a value that is greater than that of the first angle.

In accordance with another aspect of the invention, there is provided a v-band clamp that includes a band extending circumferentially from a first end to a second end, a latch assembly located at the first and second ends of the band, and a first v-insert segment located radially underneath the band when the v-band clamp is tightened on a pair of tubular body end flanges. The latch assembly includes a fastener used to tighten the v-band clamp. The first v-insert segment having a base wall, a first side wall extending from the base wall, and a second side wall extending from the base wall. The first and second side walls make a first angle in cross-sectional profile. The v-band clamp includes a second v-insert segment located radially underneath the band when the v-band clamp is tightened on the pair of end flanges. The second v-insert segment has a base wall, a first side wall extending from the base wall of the second v-insert segment, and a second side wall extending from the base wall of the second v-insert segment. The first and second side walls of the second v-insert segment make a second angle in cross-sectional profile, with the second angle having a value that is greater than that of the first angle. Different embodiments of this v-band clamp may include one or more of the following additional features either alone or according to all technically possible combinations:

The second angle may have a value that is about 5° greater than that of the first angle.
  The first angle may have a value of about 40° and the second angle may have a value of about 55°.
  The first angle may have a value of about 55° and the second angle may have a value of about 70°.
  The second v-insert segment may be located at a circumferential position of the band that is closer to the latch assembly than the first v-insert segment.
  The first v-insert segment may be attached to the band while the second v-insert segment remains unattached or loosely attached to the band when the v-band clamp is tightened on the pair of end flanges such that, during tightening of the band via the latch assembly, the band may undergo circumferential movement relative to the second v-insert segment.

In accordance with another aspect of the invention, there is provided a v-band clamp that includes a band extending circumferentially from a first end to a second end, a latch assembly located at the first and second ends of the band, and a plurality of v-insert segments located radially underneath the band when the v-band clamp is tightened on a pair of tubular body end flanges. The latch assembly includes a fastener used to tighten the v-band clamp. At least one of the plurality of v-insert segments are located at a circumferential position of the band adjacent the latch assembly and has a friction-reducing feature that reduces friction between the v-insert segment and the pair of end flanges that is generated when the v-band clamp is tightened on the pair of end flanges. Different embodiments of this v-band clamp may include one or more of the following additional features either alone or according to all technically possible combinations:

The friction-reducing feature may be provided by leaving the v-insert segment adjacent the latch assembly unattached to the band while other of the plurality of v-insert segments located at a circumferential position of the band away from the latch assembly are attached to the band.
  The plurality of v-insert segments may include two segments each located under the band at a circumferential position adjacent the latch assembly, with the friction-reducing feature comprising a sliding engagement of the band with the two segments such that the band may move circumferentially during tightening independently of the two segments.

The v-insert segment adjacent the latch assembly may have a base wall, a first side wall extending from the base wall, and a second side wall extending from the base wall, with the first and second side walls forming a first angle in cross-sectional profile. The other of the plurality of v-insert segments located at a circumferential position of the band away from the latch assembly may have a base wall, a first side wall extending from the base wall of the other of plurality of v-insert segments, and a second side wall extending from the base wall of the other of plurality of v-insert segments. The first and second side walls of the other of plurality of v-insert segments may form a second angle in cross-sectional profile, the second angle having a value that is greater than that of the first angle.

It is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
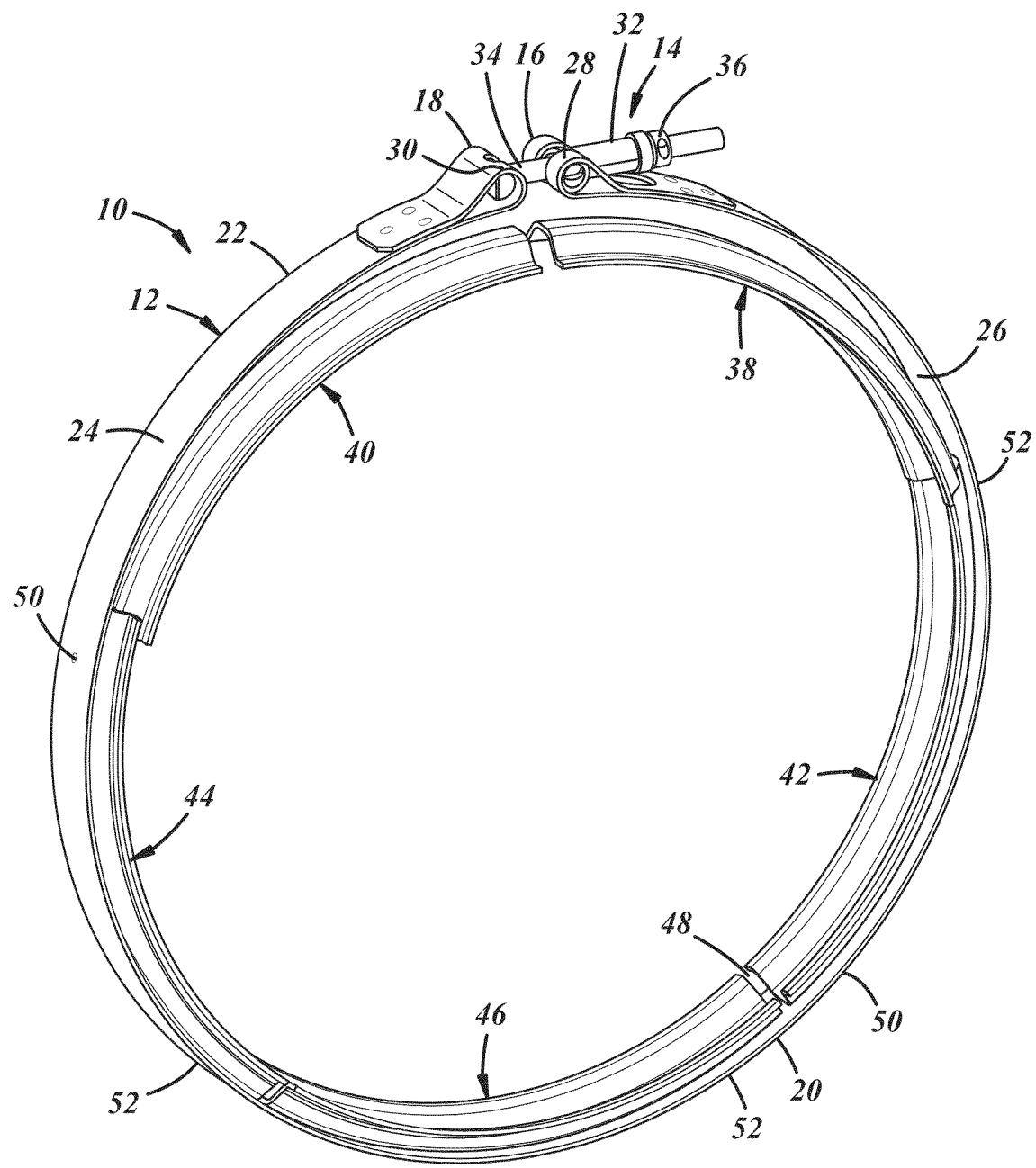
FIG. 1 is a perspective view of one embodiment of a v-band clamp.

Referring to the drawings, the figures illustrate two embodiments of a v-band clamp that distribute axial forces around their circumferences and to the associated end flanges more evenly and effectively as compared to some known v-band clamps. The v-band clamps of the figures therefore provide an improved fluid-tight joint at the end flanges. The inventors have found that some known v-band clamps exert a much lesser axial force at a location further away from its latch assembly than at a location closer to its latch assembly. That is, an axial force at a circumferential position away from a latch assembly (one example represented by arrow A in FIG. 2) is substantially less than an axial force at a circumferential position closer to the latch assembly (one example represented by arrow B in FIG. 2)—in some cases as much as one-third less. As a result, the known v-band clamps are more vulnerable to leakage at the position away from the latch assembly. The inventors have also found that at least some of the axial force is dissipated and lost through friction generated at the time of tightening and between v-insert segments and the end flanges. The v-band clamps of FIGS. 1 and 2 have therefore been designed with friction-reducing features that decrease the amount of axial force lost through friction and provide a more evenly distributed and effective joint, even at a circumferential position away from the latch assembly.

As used herein, the words axially, radially, and circumferentially are used in reference to the generally circular and cylindrical shape of the shown v-band clamps. In this sense, axially refers to a direction that is generally along or parallel to a central axis of the circular and cylindrical shape, radially refers to a direction that is generally along or parallel to an imaginary radius of the circular and cylindrical shape, and circumferentially refers to a direction that is generally along or in a similar direction as an imaginary circumference of the circular and cylindrical shape.

Figure 2:
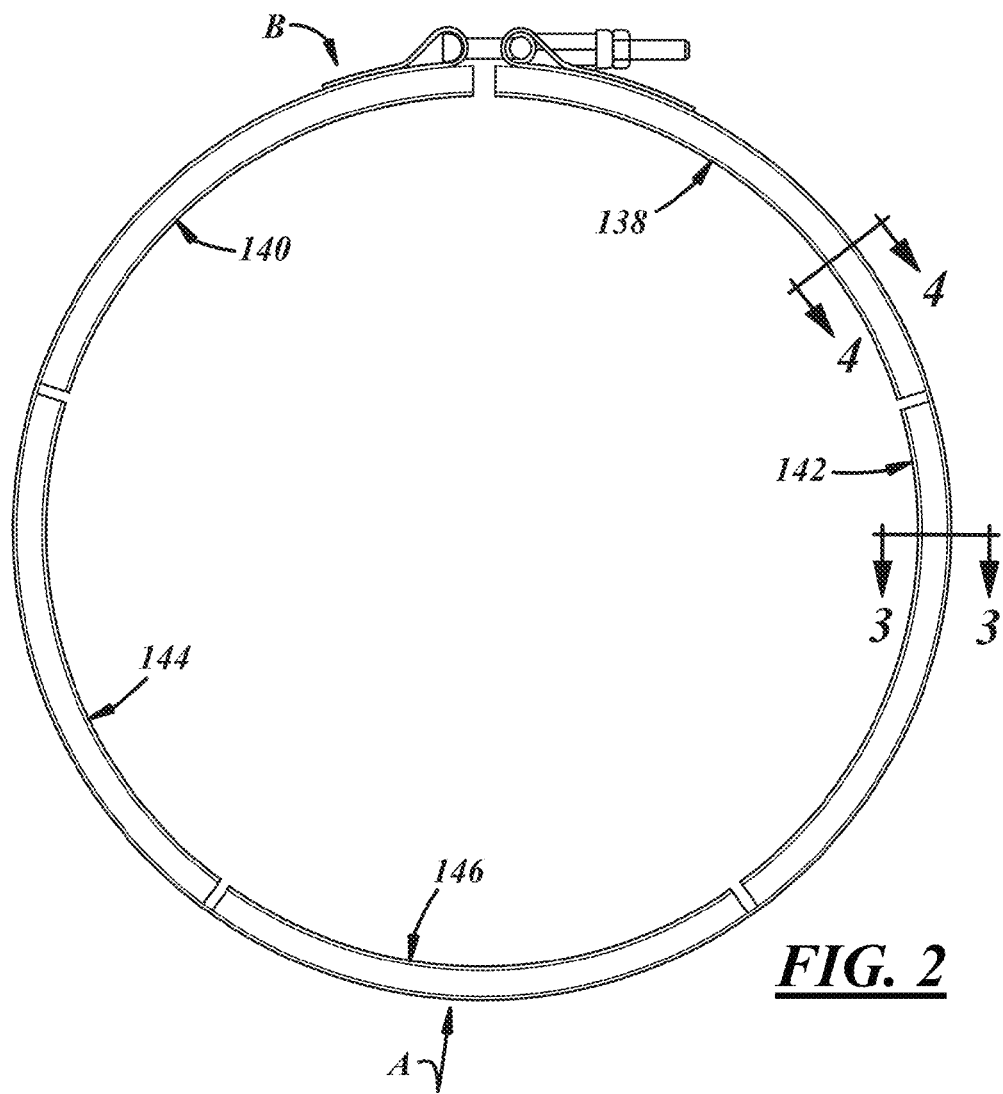
FIG. 2 is a side view of another embodiment of a v-band clamp.

The v-band clamps of FIGS. 1 and 2 can be used in applications in which a first tubular body has a first end flange extending circumferentially around and outwardly from a main tubular structure of the first tubular body, and in which a second tubular body has a second end flange extending circumferentially around and outwardly from a main tubular structure of the second tubular body. In assembly and installation, the first and second end flanges come together in closely-abutting or directly-abutting contact. Example applications include automotive applications like a diesel particulate filter system and a selective catalytic reduction system; other applications are possible including non-automotive applications in which fluid is transported from one tubular body and to another. The end flanges constitute free ends of the tubular bodies and come together in confrontation or abutment at the v-band clamp. The end flanges are slanted radially and axially away from the main tubular structure of the tubular bodies; in one example, the end flanges form an angle of about 70° with respect to a central axis of the tubular body.

Referring to the embodiment of FIG. 1, a v-band clamp 10 includes a band 12, a latch assembly 14, and a number of v-insert segments. The band 12 carries the latch assembly 14 and some of the v-insert segments in this embodiment. The band 12 can be made by stamping sheet metal and then bending the stamped piece into a roundish shape, or by another process; and the band can be made out of a stainless steel, or out of another material. At its boundaries, the band 12 has a first circumferential end 16 and a second circumferential end 18, and has a first axial end 20 and a second axial end 22. On a radially-outwardly-facing side, the band 12 has an outer surface 24, and on a radially-inwardly-facing side, the band has an inner surface 26. On each circumferential end, the band 12 has first and second loops 28, 30 that are formed when the ends of the band are folded back onto themselves and spot-welded in place. Openings located in the band 12 at the ends form structures at the loops 28, 30 to receive parts of the latch assembly 14.

The latch assembly 14 is held by the loops 28, 30 and is used to bring the circumferential ends 16, 18 of the band 12 toward and away from each other in order to tighten and loosen the v-band clamp 10 around the end flanges of the first and second tubular bodies. In this embodiment, the latch assembly 14 is a T-bolt type latch assembly and includes a trunnion 32 and a fastener comprising a T-bolt 34 and a nut 36; in other embodiments, the latch assembly can be any other suitable type that utilizes a fastener for tightening of the band 12. The trunnion 32 has nubs on opposite sides that are inserted into the first loop 28 of the band 12 and pivotally held therein; likewise, the T-bolt 34 has a head portion projecting on opposite sides and is inserted into the second loop 30. A shank portion of the T-bolt 34 is extended through a bore in the trunnion 32, and the nut 36 is threaded on the shank portion and torqued and tightened against the trunnion.

The v-insert segments are located radially underneath and inwardly of the band 12 when the v-band clamp 10 is assembled on the end flanges of the tubular bodies, and the v-insert segments receive the end flanges and directly exert radial and axial forces to the end flanges upon tightening of the latch assembly 14. Depending on the exact application, metal-to-metal contact between the first and second end flanges can form a fluid-tight joint therebetween, metal-to-metal contact between the v-insert segments and the end flanges can form a fluid-tight joint therebetween, or both. In the embodiment of FIG. 1, there are a total of five v-insert segments—a first v-insert segment 38, a second v-insert segment 40, a third v-insert segment 42, a fourth v-insert segment 44, and a fifth v-insert segment 46. In other embodiments, the v-band clamp can have a different number of v-insert segments including a total of three v-insert segments. The v-insert segments 38, 40, 42, 44, 46 are spaced apart from one another via a gap 48 where free ends of neighboring segments confront each other, and the v-insert segments are positioned around the circumference of the band 12. In this embodiment, the third, fourth, and fifth v-insert segments 42, 44, 46 are attached to the band 12 at the inner surface 26 of the band while the first and second v-insert segments 38, 40 remain unattached. The third, fourth, and fifth v-insert segments 42, 44, 46 are each physically attached to the band 12 via a first and second spot-weld 50, 52 located toward opposite circumferential ends of the respective v-insert segment. The attachment can also be provided in other ways including by crimping, mechanically fastening, and riveting. Individual v-insert segments can be made by a process that includes the steps of roll-forming a flat strip of sheet metal, bending the roll-formed piece into a helical shape, and then cutting the helical shape into individual arcs; the v-insert segments could be made by another process with different steps. The v-insert segments can be made out of a stainless steel, or out of another material.

Figure 3:
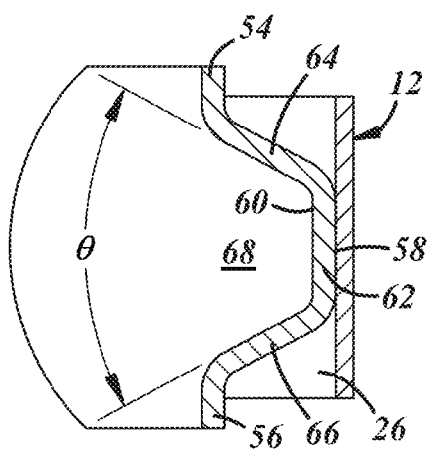
FIG. 3 is a cross-sectional view of the v-band clamp of FIG. 2 taken at 3-3.

Referring to FIG. 3 for the purpose of description, each v-insert segment 38, 40, 42, 44, 46 has a first axial end 54 and a second axial end 56. On a radially-outwardly-facing side, each v-insert segment has an outer surface 58, and on a radially-inwardly-facing side, each v-insert segment has an inner surface 60. Further, each v-insert segment has a base wall 62 and has a first and second side wall 64, 66 extending radially inwardly from the base wall. The walls define a generally concave shape when viewed from the interior of the v-band clamp 10. A channel 68 is located within the space defined partly by the base wall 62 and the first and second side walls 64, 66, and receives the end flanges of the tubular bodies when brought together in assembly and installation. The first and second side walls 64, 66 are generally planar in cross-sectional profile as shown in FIG. 3 and, if continued beyond the base wall 62, make an angle $\theta$. The exact value of the angle $\theta$ will depend in part upon the angle of the end flanges of the tubular bodies, and will also depend in part upon a desired radial and axial force to be exerted to the end flanges. In general and with some limitations, the smaller the value of the angle $\theta$ with respect to a given angle of the end flanges, the greater the force exerted to the end flanges. In examples according to the embodiment of FIG. 1, in an untightened state, the angle $\theta$ has a value ranging between about 38°-42°, or about 40°, and has a value ranging between about 53°-57°, or about 55°; other examples and values for the angle $\theta$ are possible.

In the embodiment of FIG. 1, the friction-reducing feature is provided by keeping the first and second v-insert segments 38, 40 unattached to, and separate from, the band 12, while the other v-insert segments 42, 44, 46 are attached to the band. In other words, the first and second v-insert segments 38, 40 are free floating and do not have a physical attachment to the band 12. The first and second v-insert segments 38, 40 are located closest to the latch assembly 14 and immediately adjacent the latch assembly, meaning that these v-insert segments can exert the greatest amount of force against the end flanges of the tubular bodies. This also means that these v-insert segments 38, 40 can generate the greatest amount of friction with the end flanges at the time of tightening. By keeping the band 12 and the first and second v-insert segments 38, 40 unattached in the embodiment of FIG. 1, the band and the first and second v-insert segments are capable of moving independent of each other upon tightening of the v-band clamp 10. This way, the band 12 can move circumferentially with respect to the first and second v-insert segments 38, 40 while the v-insert segments do not substantially move with the band and therefore generate less, little, or no friction with the end flanges of the tubular bodies. Forces are more evenly distributed and effectively transferred to the third, fourth, and fifth v-insert segments 42, 44, 46 and to a circumferential position on the band 12 opposite and further away from the latch assembly 14. This is in contrast to some known v-band clamps in which all of its v-insert segments are attached to its band, and where the v-insert segments located immediately adjacent its latch assembly move circumferentially with the band upon tightening; metal-to-metal moving contact between the v-insert segments at the latch assembly and the end flanges generates a relatively substantial amount of friction which inhibits the transfer of axial force to a circumferential position on the band further away from the latch assembly.

In assembly and installation, the first and second tubular bodies are brought together with the first and second end flanges in closely-abutting or directly-abutting contact. The first and second v-insert segments 38, 40 can be initially placed over the end flanges apart from placement of the band 12 and its attached v-insert segments 42, 44, 46 over the end flanges. As the v-band clamp 10 is tightened, the inner surface 26 of the band 12 can move over and abuttingly against the outer surface 58 of the first and second v-insert segments 38, 40. The first and second v-insert segments 38, 40 can remain in-place or only slightly move on the first and second end flanges as this happens. At complete tightening, the inner surface 26 of the band 12 is taut against the outer surface 58 of the first and second v-insert segments 38, 40, and the first, second, third, fourth, and fifth v-insert segments exert radial and axial forces against the end flanges.

Figure 5:
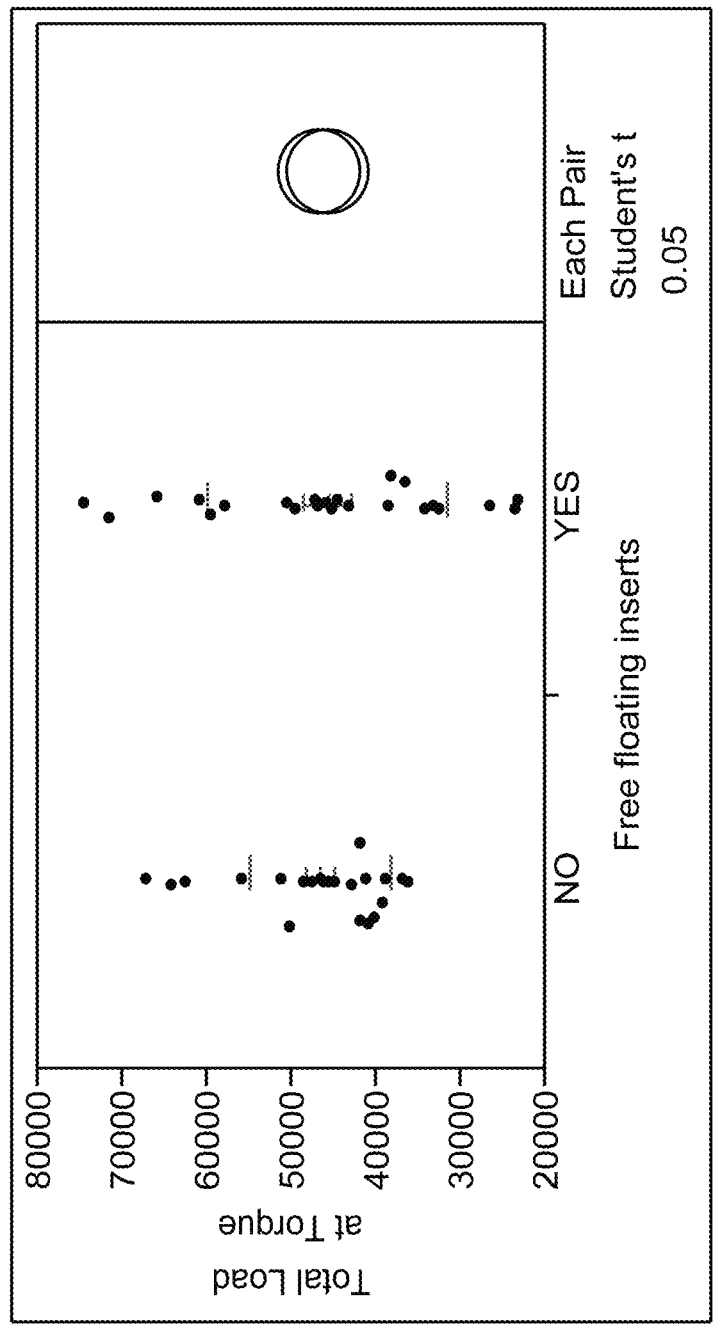
FIG. 5 is a chart of testing data comparing the resulting total axial loads at a given tightened torque value of a v-band clamp with unattached v-insert segments (YES) and a v-band clamp with all of its v-insert segments attached (NO)
Figure 6:
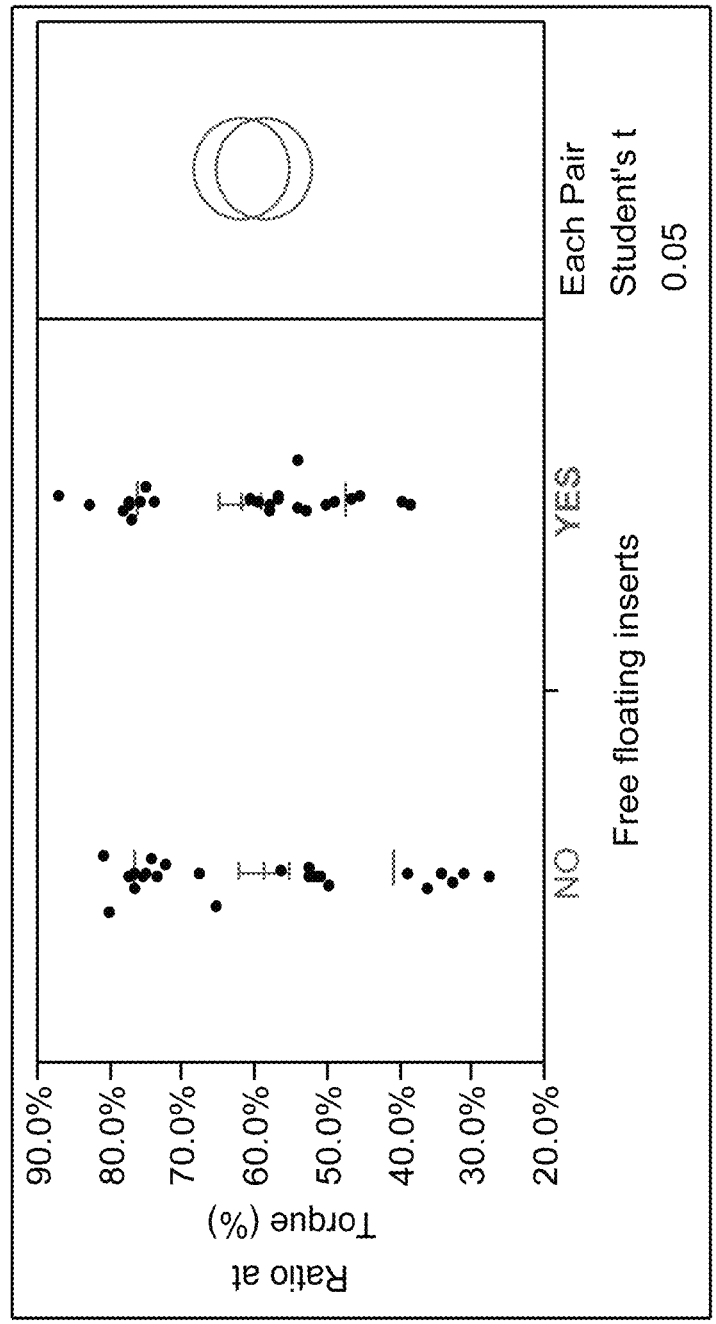
FIG. 6 is a chart of testing data comparing the axial load distribution ratios at the given torque value of FIG. 5, of a v-band clamp with unattached v-insert segments (YES) and a v-band clamp with all of its v-insert segments attached (NO)

FIG. 5 is a chart with testing data that compares the resulting total axial loads at a tightening torque value of about 35 Nm at 300 RPM. The data on the left side of the chart marked by the word "NO" comes from testing performed on a v-band clamp having all of its v-insert segments attached via spot welding (similar to the above-described known v-band clamps). And the data on the right side of the chart marked by the word "YES" comes from testing performed on a v-band clamp similar to the embodiment of FIG. 1 in which two of its v-insert segments immediately adjacent its latch assembly remain unattached to its band. FIG. 6 is a chart with testing data that compares the axial load distribution ratios of the tests performed for FIG. 5. These tests showed a 14% improvement in axial load distribution ratios for the v-band clamp similar to the embodiment of FIG. 1, compared to that for the known v-band clamps. Of course, not all testing and experiments will yield this exact data.

In another embodiment similar to that of FIG. 1 but not shown in the figures, the v-insert segments need not be completely unattached from the band. Instead, the v-insert segments located immediately adjacent the latch assembly can be loosely attached to the band via one or more projections extending from the band and interacting with one or more complementary slots or openings located in the v-insert segments; in yet another example, the projections could extend from the v-insert segments and the slots or opening could be located in the band. Interaction between the projections and slots/openings could prevent axial movement, radial movement, or both movements between the band and the v-insert segments, but still permit independent circumferential movement between the band and the v-insert segments.

Figure 4:
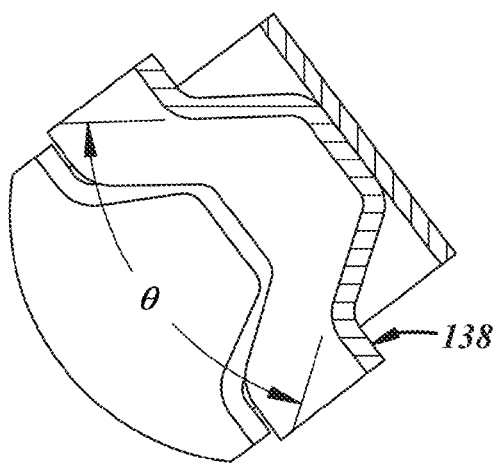
FIG. 4 is a cross-sectional view of the v-band clamp of FIG. 2 taken at 4-4.

The embodiment of the v-band clamp of FIGS. 2-4 is similar in some ways to the embodiment of FIG. 1. These similarities—including the band, latch assembly, and some constructions of the v-insert segments—will not be repeated here. The friction-reducing feature for this embodiment, however, is different than that of FIG. 1 and is described below.

In the embodiment of FIGS. 2-4, the friction-reducing feature is provided by giving the first and second v-insert segments 138, 140 an angle θ with a greater value than the angle θ of the third, fourth, and fifth v-insert segments 142, 144, 146. This way, the first and second v-insert segments 138, 140 exert less force against the end flanges of the tubular bodies when initially placed therearound and while in the midst of tightening, as compared to the force exerted by the third, fourth, and fifth v-insert segments 142, 144, 146. The first and second v-insert segments 138, 140 more freely move circumferentially with the band 12 and with respect to the end flanges, and therefore generate less, little, or no friction with the end flanges. Forces are more evenly distributed and effectively transferred to the third, fourth, and fifth v-insert segments 142, 144, 146 and to a circumferential position on the band opposite and further away from the latch assembly. This is in contrast to some known v-band clamps in which all its v-insert segments have the same angle θ; the exact value of the same angle θ is selected to exert a desired radial and axial force to the end flanges after tightening and without regard to the friction generated between the v-insert segments and the end flanges during tightening. Accordingly, in these known v-band clamps, metal-to-metal moving contact between the v-insert segments at the latch assembly and the end flanges generates a relatively substantial amount of friction which inhibits the transfer of axial force to a circumferential position on the band further away from the latch assembly.

In one example according to the embodiment of FIGS. 2-4, in an untightened state, the angle θ for the first and second v-insert segments 138, 140 has a value ranging between about 53°-57°, or about 55°, while the angle θ for the third, fourth, and fifth v-insert segments 142, 144, 146 has a value ranging between about 38°-42°, or about 40°. In another example according to the embodiment of FIGS. 2-4, in an untightened state, the angle θ for the first and second v-insert segments 138, 140 has a value ranging between about 68°-72°, or about 70°, while the angle θ for the third, fourth, and fifth v-insert segments 142, 144, 146 has a value ranging between about 53°-57°, or about 55°. Of course, other examples and values for the angles θ are possible. For example, in an untightened state, the angle θ for the first and second v-insert segments 138, 140 can have a value about 5° greater than the value for the angle θ for the third, fourth, and fifth v-insert segments 142, 144, 146.

Figure 7:
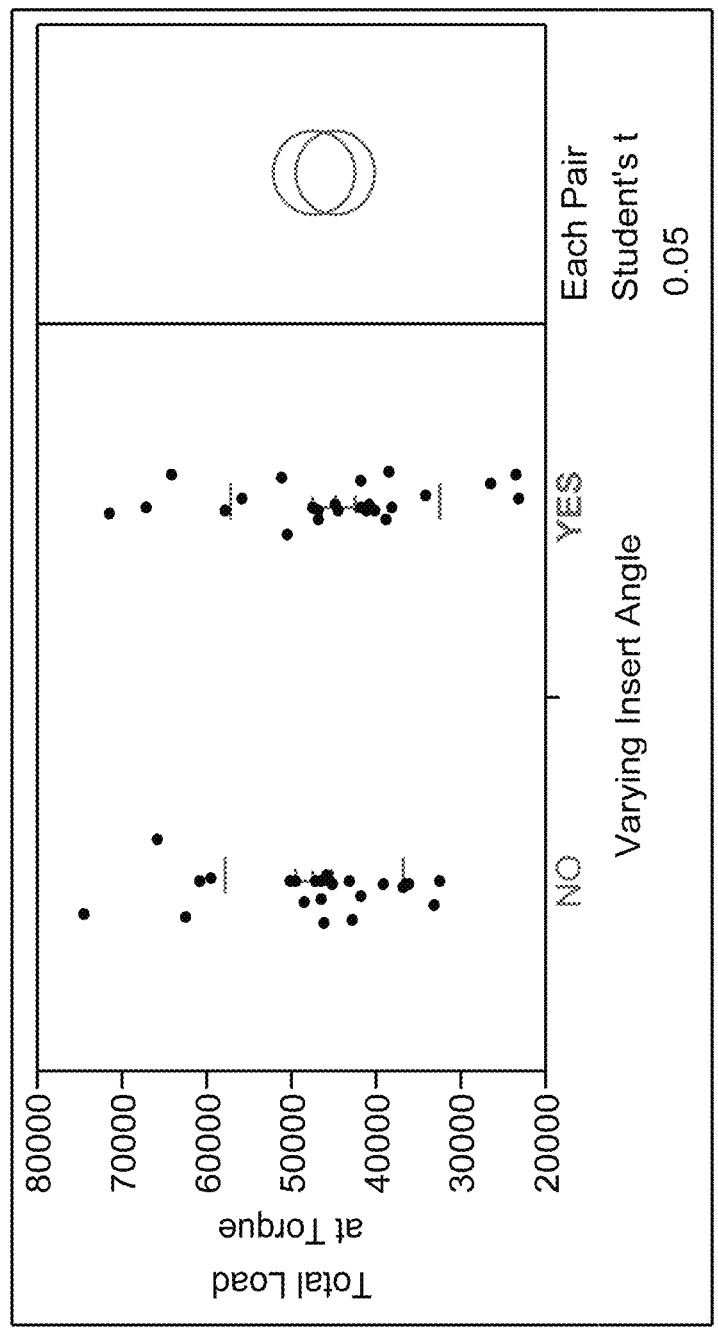
FIG. 7 is a chart of testing data comparing the resulting total axial loads at a given tightened torque value of a v-band clamp with v-insert segments having side walls that make different angles with one another (YES) and a v-band clamp with v-insert segments having side walls that make the same angles with one another (NO)
Figure 8:
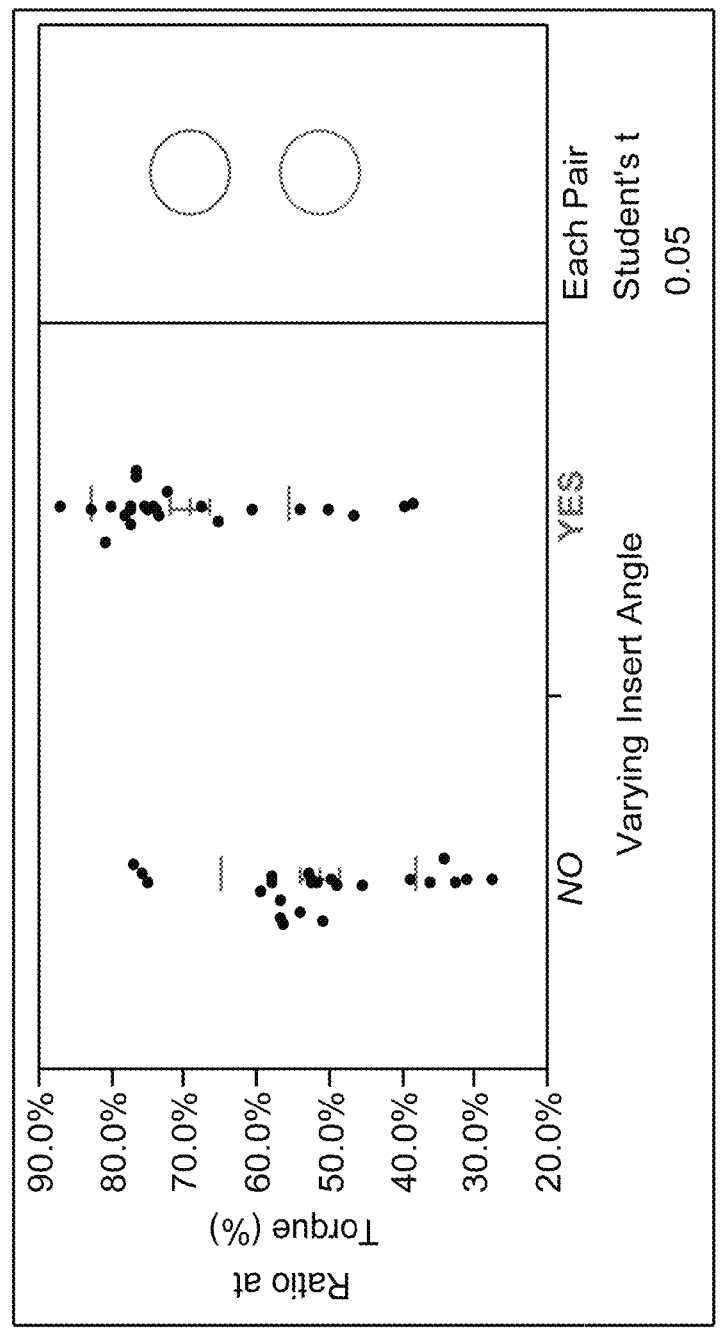
FIG. 8 is a chart of testing data comparing the axial load distribution ratios at the given torque value of FIG. 7, of a v-band clamp with v-insert segments having side walls that make different angles with one another (YES) and a v-band clamp with v-insert segments having side walls that make the same angles with one another (NO).

FIG. 7 is a chart with testing data that compares the resulting total axial loads at a tightening torque value of about 35 Nm at 300 RPM. The data on the left side of the chart marked by the word "NO" comes from testing performed on a v-band clamp with v-insert segments having side walls that make that same angle θ with respect to one another (similar to the above-described known v-band clamps). And the data on the right side of the chart marked by the word "YES" comes from testing performed on a v-band clamp similar to the embodiment of FIG. 2 in which two of its v-insert segments immediately adjacent its latch assembly have side walls that make an angle θ that is greater than an angle θ made by side walls of v-insert segments located away from the latch assembly. FIG. 8 is a chart with testing data that compares the axial load distribution ratios of the tests performed for FIG. 7. These tests showed a 33% improvement in axial load distribution ratios for the v-band clamp similar to the embodiment of FIG. 2, compared to that for the known v-band clamps. These tests also showed a 5% decrease in total axial load for the v-band clamp similar to the embodiment of FIG. 2, compared to that for the known v-band clamp; this decrease is deemed acceptable given the improvement in axial load distribution ratio. Of course, not all testing and experiments will yield this exact data.

It should be appreciated that different embodiments of the v-band clamp not necessarily shown in the figures can have different designs and constructions. For example, the friction-reducing features of the embodiments of FIGS. 1 and 2 can be combined in a single v-band clamp; that is, a v-band clamp can have an unattached v-insert segment with angled side walls greater than those of attached v-insert segments.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A generally circular v-band clamp:
a band extending circumferentially from a first end to a second end;
a latch assembly located at said first and second ends of said band, said latch assembly including a fastener used to tighten the v-band clamp; and
a plurality of v-insert segments located radially underneath said band when the v-band clamp is tightened on a pair of tubular body end flanges, said plurality of v-insert segments including a first v-insert segment attached to said band and a second v-insert segment extending circumferentially with respect to the generally circular shape of the v-band clamp from a first circumferential end of the second v-insert segment to a second circumferential end of the second v-insert segment and being unattached from said band along a circumferential extent of said band between said first and second circumferential ends, wherein, when the v-band clamp is tightened on the pair of end flanges, said band moves circumferentially independently relative to said second v-insert segment.

2. The v-band clamp of claim 1, wherein said first v-insert segment is attached to said band via at least one spot weld.

3. The v-band clamp of claim 1, wherein said second v-insert segment remains unattached to said band when the v-band clamp is tightened on the pair of end flanges.

4. The v-band clamp of claim 1, wherein said first v-insert segment is located at a circumferential position of said band that is away from said latch assembly, and said second v-insert segment is located at a circumferential position of said band that is adjacent said latch assembly.

5. The v-band clamp of claim 1, wherein said first v-insert segment has a base wall, a first side wall extending from said base wall, and a second side wall extending from said base wall, said first and second side walls making a first angle in cross-sectional profile, and wherein said second v-insert segment has a base wall, a first side wall extending from said base wall of said second v-insert segment, and a second side wall extending from said base wall of said second v-insert segment, said first and second side walls of said second v-insert segment making a second angle in cross-sectional profile, said second angle having a value that is greater than that of said first angle.

6. The v-band clamp of claim 5, wherein said second angle has a value that is about 5° greater than that of said first angle.

7. The v-band clamp of claim 5, wherein said first angle has a value of about 40° and said second angle has a value of about 55°.

8. The v-band clamp of claim 5, wherein said first angle has a value of about 55° and said second angle has a value of about 70°.

9. A v-band clamp comprising:
a band extending circumferentially from a first end to a second end;
a latch assembly located at said first and second ends of said band, said latch assembly including a fastener used to tighten the v-band clamp; and
a plurality of v-insert segments located radially underneath said band when the v-band clamp is tightened on a pair of tubular body end flanges;
at least a first of said plurality of v-insert segments being located at a circumferential position of said band adjacent said latch assembly, the v-band clamp having a friction-reducing feature established between said first v-insert segment and said band or the pair of end flanges, said friction-reducing feature reduces friction between said first v-insert segment and said band or the pair of end flanges that is generated when the v-band clamp is tightened on the pair of end flanges, at least a second of said plurality of v-insert segments being located at a circumferential position of said band farther away from said latch assembly than said first v-insert segment, said second v-insert segment attached to said band and lacking a friction-reducing feature established between said second v-insert segment and said band or the pair of end flanges.

10. The v-band clamp of claim 9, wherein said friction-reducing feature is provided by leaving said v-insert segment adjacent said latch assembly unattached to said band while other of said plurality of v-insert segments located at a circumferential position of said band away from said latch assembly are attached to said band.

11. The v-band clamp of claim 9, wherein said plurality of v-insert segments include two segments each located under said band at a circumferential position adjacent said latch assembly, and wherein said friction-reducing feature comprises a sliding engagement of said band with said two segments such that said band may move circumferentially during tightening independently of said two segments.

12. The v-band clamp of claim 9, wherein said friction-reducing feature is provided by said v-insert segment adjacent said latch assembly having a base wall, a first side wall extending from said base wall, and a second side wall extending from said base wall, said first and second side walls making a first angle in cross-sectional profile, and other of said plurality of v-insert segments located at a circumferential position of said band away from said latch assembly having a base wall, a first side wall extending from said base wall of said other of plurality of v-insert segments, and a second side wall extending from said base wall of said other of plurality of v-insert segments, said first and second side walls of said other of plurality of v-insert segments making a second angle in cross-sectional profile, said first angle having a value that is greater than that of said second angle.

* * * * *